United States Patent
Lu (10) Patent No.: US 7,376,943 B2
(45) Date of Patent: May 20, 2008

(54) SAFE METHOD FOR UPGRADING FIRMWARE OF OPTICAL DISK PRODUCT

(75) Inventor: Karl Lu, Shanghai (CN)

(73) Assignee: LSI Corporation, Milpitas, CA (US)

( * ) Notice: Subject to any disclaimer, the term of this patent is extended or adjusted under 35 U.S.C. 154(b) by 834 days.

(21) Appl. No.: 10/771,588

(22) Filed: Feb. 4, 2004

(65) Prior Publication Data
US 2005/0138645 A1  Jun. 23, 2005

Related U.S. Application Data

(60) Provisional application No. 60/531,277, filed on Dec. 18, 2003.

(51) Int. Cl.
G06F 9/44 (2006.01)
(52) U.S. Cl. .................. 717/168; 717/174
(58) Field of Classification Search ......... 717/168–178
See application file for complete search history.

(56) References Cited

U.S. PATENT DOCUMENTS

| | | | | |
|---|---|---|---|---|
| 5,649,200 | A * | 7/1997 | Leblang et al. | 717/122 |
| 5,675,802 | A * | 10/1997 | Allen et al. | 717/103 |
| 5,968,141 | A | 10/1999 | Tsai | 710/14 |
| 6,038,612 | A * | 3/2000 | Liow | 710/1 |
| 6,135,651 | A * | 10/2000 | Leinfelder et al. | 717/168 |
| 6,347,396 | B1 * | 2/2002 | Gard et al. | 717/168 |
| 6,393,499 | B1 * | 5/2002 | Chaiken et al. | 710/19 |
| 6,681,382 | B1 * | 1/2004 | Kakumani et al. | 717/122 |
| 6,708,231 | B1 * | 3/2004 | Kitagawa | 710/10 |
| 6,792,480 | B2 * | 9/2004 | Chaiken et al. | 710/14 |
| 6,795,912 | B1 * | 9/2004 | Itoh et al. | 713/2 |
| 6,907,602 | B2 * | 6/2005 | Tsai et al. | 717/168 |
| 6,938,243 | B1 * | 8/2005 | Zeevi et al. | 717/124 |
| 6,944,856 | B2 * | 9/2005 | Taylor | 717/171 |
| 6,948,164 | B2 * | 9/2005 | Tinker | 717/168 |
| 6,978,453 | B2 * | 12/2005 | Rao et al. | 717/171 |
| 7,089,550 | B2 * | 8/2006 | Bakke et al. | 717/173 |
| 7,165,124 | B2 * | 1/2007 | Fujita et al. | 710/22 |
| 7,181,458 | B1 * | 2/2007 | Higashi | 707/100 |
| 7,233,559 | B2 * | 6/2007 | Tanimukai et al. | 369/53.37 |

OTHER PUBLICATIONS

"Dual Indirect RAM/ROM Jump tables for Firmware Updates", Jun. 1988, IBM Technical Disclosure Bulletin, IBM Corporation, vol. 31, No. 1, pp. 292-299.*

* cited by examiner

*Primary Examiner*—Todd Ingberg
(74) *Attorney, Agent, or Firm*—Suiter Swantz PC LLO (57) ABSTRACT

The present invention provides a safe method for upgrading firmware code for optical disk products without corrupting firmware even if an abnormality occurs during a upgrading a firmware process. A nonvolatile memory device of the present invention may store a boot system image and an application ware image separately. End users may update the application ware image by executing an upgraded application program. However the boot system image stored in the nonvolatile memory device may not be modified at any event and it may be used to restore the optical disk product from a system failure caused by a corrupted firmware.

14 Claims, 5 Drawing Sheets

SAFE METHOD FOR UPGRADING FIRMWARE OF OPTICAL DISK PRODUCT

CROSS REFERENCE TO RELATED APPLICATIONS

The present application claims priority under 35 U.S.C. § 119 to U.S. Provisional Application Ser. No. 60/531,277 filed Dec. 18, 2003. Said U.S. Provisional Application No. 60/531,277 is hereby incorporated by reference.

FIELD OF THE INVENTION

The present invention generally relates to the field of electronic product with an optical disk drive, and more particularly to a method for upgrading a firmware of it.

BACKGROUND OF THE INVENTION

Optical disk drives, in particular the category of Digital Versatile Disk (DVD) drives and Compact Disk (CD) drives, are widely employed in consumer electronic products such as DVD players and recorders. This kind of product has a firmware code memory device and a controller that executes the firmware code. With the firmware code, the optical disk drive can read data files stored on the Compact Disk Read Only Memory (CD-ROM) or DVD, write data files on the CD-ROM or DVD, and playback music CD, video DVD or music DVD. This firmware code is usually stored in non-volatile semiconductor memory devices, such as the erasable-programmable read-only memory (EPROM) or electrically erasable-programmable read-only memory (EEPROM).

Often, the firmware code of these products may be modified to correct program problems (program bugs) and provide additional functionality (improvements).

Conventional solutions to modifying the firmware code of these products have involved replacement of the firmware code stored in the semiconductor memory device with a new firmware code. If the semiconductor memory used for storing the firmware code is a device like an EPROM, it must be removed from its inserted socket or de-soldered from the printed circuit board so as to implement reprogramming of its memory content.

If the semiconductor memory used for storing the firmware code is a device like an EEPROM, the firmware can be modified (rewritten) by executing an upgraded firmware code. Many manufacturers now provide optical disks storing upgraded firmware code for end users. The end users may insert the optical disk to the disk drive to execute the upgraded firmware code stored in the optical disk. As a result, the firmware code stored in the semiconductor of the product may be replaced with the upgraded firmware code.

However, the above described conventional solution which allows the end user to upgrade the firmware may create serious problems. Conventionally, the application ware which rewrites the firmware upon upgrading command is compressed and stored in EEPROM, together with the other programming code for the optical disk device. Therefore the firmware image can be rewritten only after the whole firmware is erased. However, if an abnormality occurs during the rewriting procedure, the EEPROM may be wiped out (no firmware code) or the EEPROM may store a corrupted firmware code.

As such, the conventional solutions to upgrading the firmware associated with the optical disk drive may render the whole product inoperable especially when the upgrading was terminated by unexpected event such as power failure, invalid application ware, disk read error and the like. Consequently, an improved method for safe way to upgrade firmware without rendering the device inoperable is necessary.

SUMMARY OF THE INVENTION

Accordingly, the present invention provides a safe method for upgrading firmware code using disk drives without corrupting firmware even if an abnormality occurs during a upgrading a firmware process. In an embodiment of the invention, the invention may provide a safe method for upgrading the firmware code of an optical disk product (DVD player or recorder) by employing an optical disk product which comprises a nonvolatile memory device for storing a firmware code with a boot system image (a first program) and an application ware image (a second program) separately. In an advantageous aspect of the present invention, the boot system image of the firmware code stored in the volatile memory device may not be modified and may be used to restore the optical disk product from a system failure caused by a corrupted application ware.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
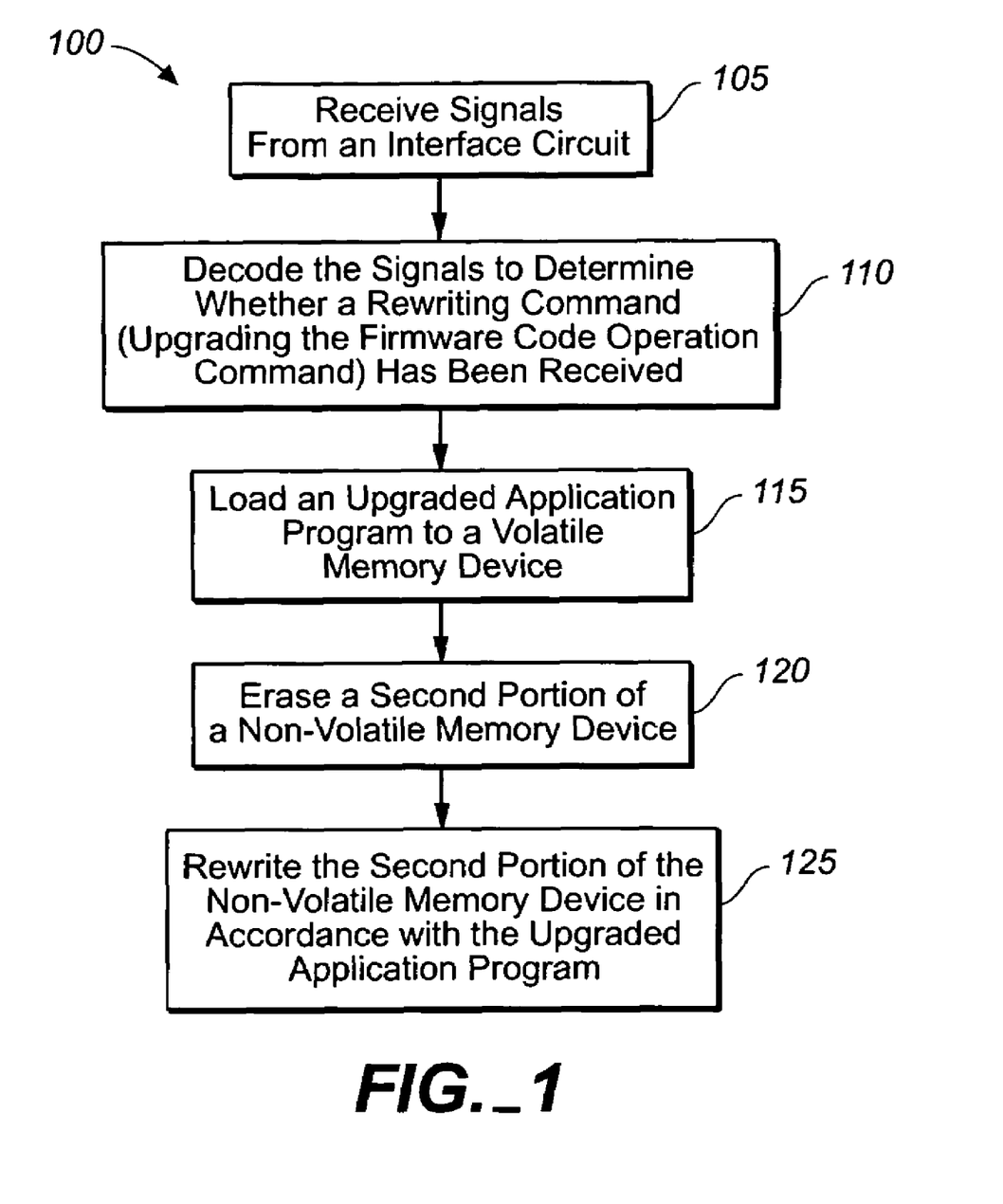
FIG. 1 is a flowchart showing an exemplary method for upgrading the firmware of an optical disk product in accordance with an exemplary embodiment of the present invention.
Figure 2:
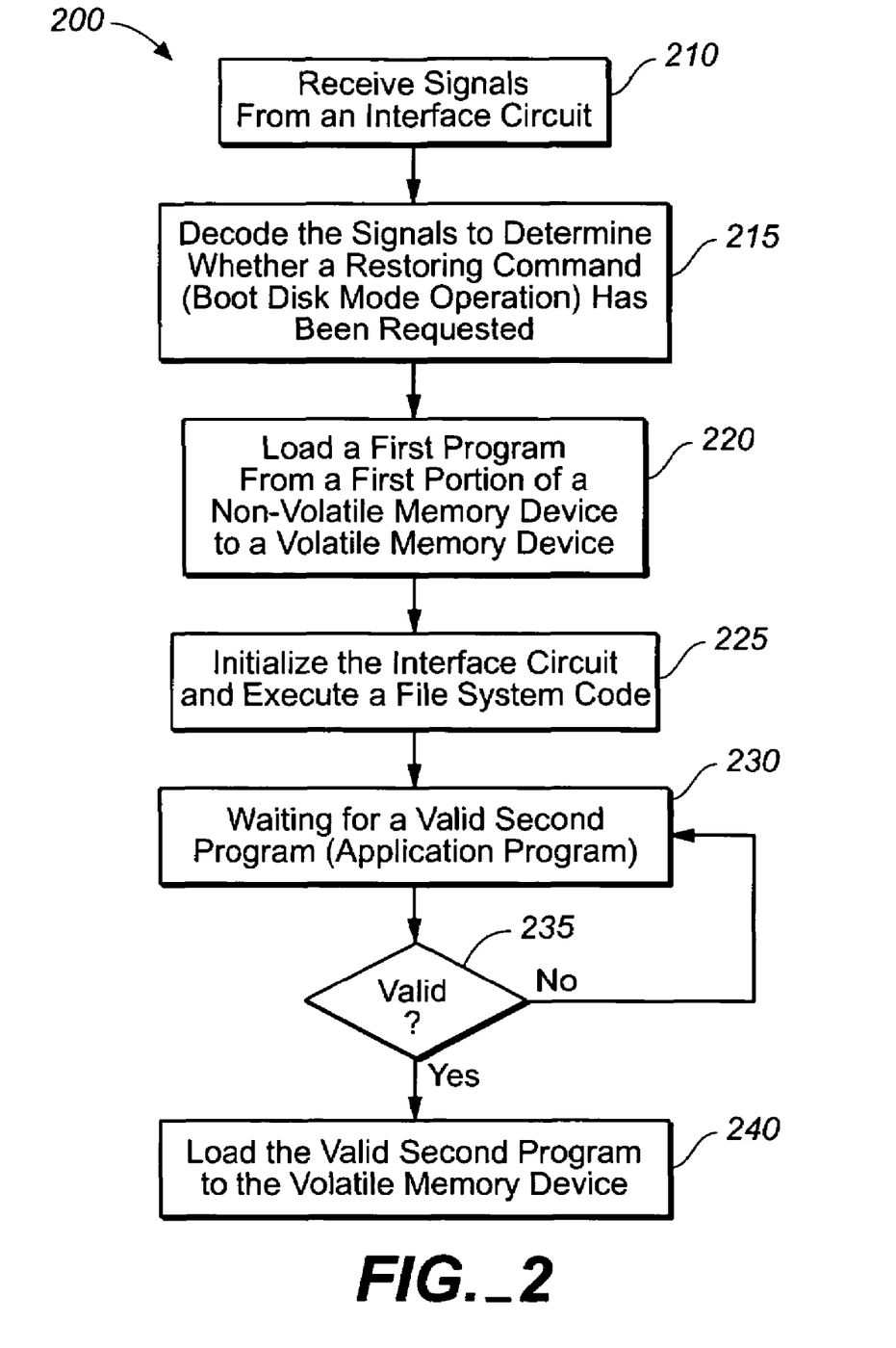
FIG. 2 is a flowchart showing an exemplary method for restoring the optical disk product in accordance with an exemplary embodiment of the present invention.

Referring generally now to FIGS. 1 through 2, exemplary embodiments of the present invention are discussed, wherein a safe method for upgrading firmware of optical disk products is employed. The method of the present invention allows a manufacture to provide a new application ware for the firmware of optical disk product to end users without facing a risk of corruption of the firmware.

Referring to FIG. 1, a flow chart of an exemplary process 100 used for upgrading the firmware in accordance with the present invention is shown. An end user may start executing an upgraded application program stored in a recording medium such as an optical disk, a hard drive of the host computer or the like. Execution of the upgraded application program may be implemented by insertion of the optical disk into an optical disk drive. Then, an upgrading the firmware command (rewriting command) may be supplied to an interface circuit as a series of signals (inputs) coming from a recording medium (a source external to the optical disk drive). The process 100 may start with the step in which an interface circuit receives signals 105 from a source external to the optical disk drive. An example of an interface circuit may be an Attachment Packet Interface (ATAPI) circuit. According to this arrangement, it is possible to easily use a new interface such as enhanced Integrated Drive Electronics (IDE) while inheriting the past accumulated software property for optical disk drives which conform to the Small Computer System Interface (SCSI) interface specifications or the like. If an optical disk drive is to be mounted as standard equipment in a computer such as a personal computer which includes, for example, a Peripheral Component Interconnect (PCI) bus as the bus and an IDE interface controller as the interface controller, the ATAPI interface circuit can be adopted as the interface circuit of the optical disk drive. In almost all cases, if the optical disk drive is to be mounted as standard equipment in the computer, a main board and the optical disk drive are incorporated in one case.

The received signals by the interface circuit are decoded to be determined whether an upgrading the firmware code operation command (a rewriting command) has been requested 110. A firmware program is a software driver of an optical disk product. Examples of a firmware program may include a DVD-Recordable (DVD-R) driver, DVD-Audio (DVD-A) driver, DVD+Read Write (DVD+RW) driver, CD-ROM driver and the like. A firmware program may be stored in non-volatile semiconductor memory devices, such as EEPROM, a Flash memory and the like. Based on the firmware program code, a optical disk product may perform its desirable functionality, such as playing music CD, Video CD (VCD), or DVD, reading data from CD-ROM, DVD-R, or DVD+RW, or writing data to CD-ROM or DVD+RW. A firmware program code may be upgraded by an execution of an application program. Under certain circumstances, upgrading of a firmware code may not be avoidable. For example, if an optical disk product has been sold with program problems (program bugs) that might cause the product to malfunction, the manufacturer of the optical disk product may be responsible for the problem. Upon program bugs, the firmware code may have to be upgraded, namely, replaced by another copy without the problem. Further, upgrading of firmware code may be preferable when a product may be enhanced by installment of new firmware code.

In the present invention, to provide reliable upgrading process, the nonvolatile memory may have a first portion which stores a boot system image (a first program) and a second portion which stores an application ware image (a second program). The first portion of the nonvolatile memory is an area which stores a boot system ware which allows the controller to execute processing for restoring the optical disk product. The first portion may be determined virtually by the size of the boot system image and the nonvolatile memory device sector alignment. The rest of available nonvolatile memory area (other than the first portion) is the second portion of the nonvolatile memory. The second portion stores an application ware image to be executed by the controller for the operation of the disk. An example of application program may be an access control program. The access control program may perform control such as speed control of a disk and signal processing according to the speed of reproduction of recorded information.

Next, the process 100 may load an upgraded application program (supplied to interface circuit from outside of the optical disk device) to a volatile memory device 115. An example of a volatile memory device may be a Dynamic Random Access Memory (DRAM). The upgraded application program may be supplied to interface circuit from a source external to the device. An example of a source external to the optical disk product may be a Digital Versatile Disk (DVD). Another example of a source external to the optical disk product may include a CD-ROM disk, a hard disk of host computer, or the like. Further, the upgraded application program may be supplied from a manufacturer to an end user through communications means such as the Internet. Accordingly, it is possible to instantaneously send the upgraded application program to the computer maker, the company which sells the computer, or the end user of the computer.

A controller may start an upgrading process by erasing the application ware image stored in the second portion of the nonvolatile memory 120. In the present invention, only the second portion of the firmware may be erased. Accordingly, only the application ware image may be erased 120 upon the upgrading process since the second portion stores the application ware image. The first portion of the firmware may not be allowed to be erased or rewritten. Therefore, the boot system ware stored in the first portion may not be modified upon the upgrading process, even if an abnormality may have occurred during the upgrading process, the boot system ware may be used to restore the optical disk product back before the abnormality may have occurred. An example of an abnormality may be a power failure during upgrading process. Upon a power failure, any program including the application program of the optical disk product loaded into DRAM may be disappeared. Additionally, the application ware image stored in the nonvolatile memory may also be deleted in whole or in part as a result of the upgrading process. This casualty (no application ware or half deleted application ware) may render the optical disk product inoperable. Another example of an abnormality may include an invalid upgraded application program, a disk read error and the like. After the step 120, the original application ware may be still loaded in the volatile memory device to allow the controller to execute the upgrading process. Then, the controller may rewrite the second portion of the nonvolatile memory in accordance with the upgraded application program (the upgraded second program) loaded in the volatile memory 125.

Referring now to FIG. 2, a flow chart of an exemplary process 200 used for restoring the optical disk product in accordance with the present invention is shown. Referring back to FIG. 1, the process 100 may be terminated by unexpected events before the upgraded application program was successfully rewritten into the nonvolatile memory device 125. An example of the unexpected events may be a power failure. In the event of a power failure, the volatile memory may lose all of its contents including the boot system code, the application program and the upgraded application program, while the application ware image stored in the nonvolatile memory device may have been erased in whole or in part 120. When an unexpected event may happen, an end user may send a restoring command to the optical disk product as directed by the manufacturer who provides the upgrading application program. For example, a user can press a reset button of the front panel of the optical disk product to activate the restoring. Then, the restoring command may be supplied to an interface circuit as a series of signals (inputs).

The process 200 may start with the step in which an interface circuit receives signals 205. The received signals may be decoded to be determined whether a boot disk mode operation (a restore command) has received 210. Upon reception of a restore command, the controller may load a boot system ware stored in the first portion of a nonvolatile memory to a volatile memory device 215. The boot system ware may include program code that allow the controller to copy or decompress the application ware to the volatile memory device from the second portion of the nonvolatile memory device or from a source external of the optical disk product. Additionally, the boot system ware may include an interface circuit driver and a disk file system. Further, the controller may execute the boot system code to initialize an interface circuit and to run a disk file system 220 to allow a controller to load a valid application program (a valid second program) from outside of the optical disk product. The valid application program may be provided to the volatile memory device from a source external of the optical disk product 240. Before loading the valid application program, the controller may check whether a valid application program is provided to restore the optical disk product 235. If the valid application program is provided, the valid application program may be loaded to volatile memory device, and then the optical disk product may be restored and ready for the upgrading process 240. If the valid application program is not provided yet, the process may return to step 230 and may wait for the valid second program 230.

Figure 3:
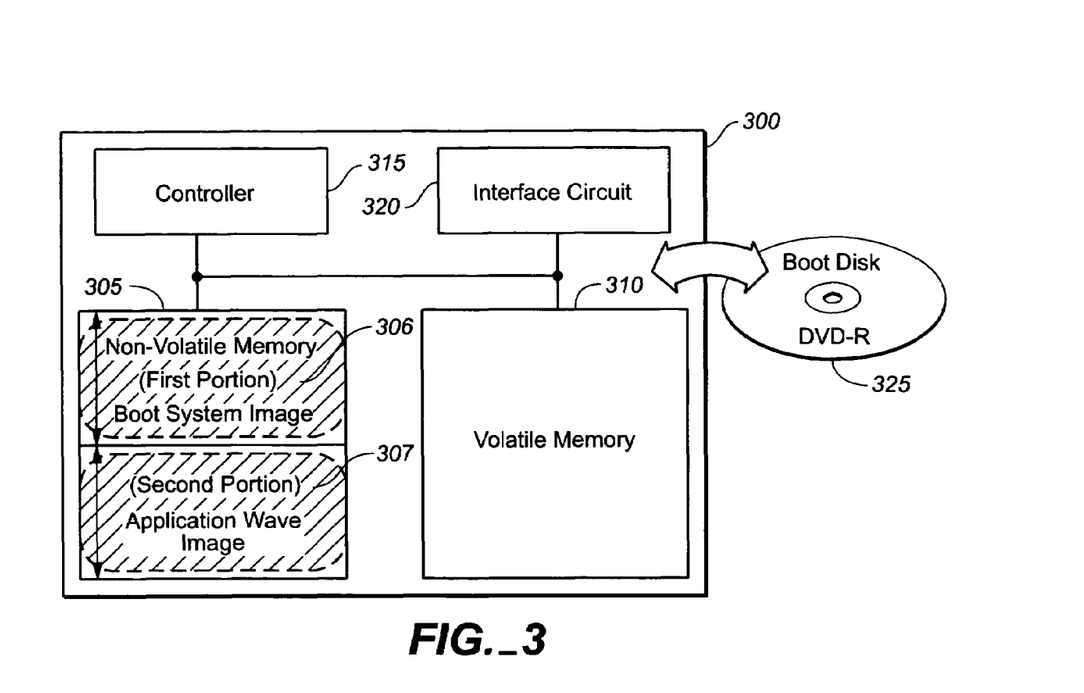
FIG. 3 is a schematic block diagram illustrating an exemplary optical disk product in accordance with the present invention.

Referring to FIG. 3, a schematic block diagram of an exemplary embodiment 300 of the present invention is shown. A optical disk product 300 may include an optical disk drive such as DVD drive, CD-ROM drive and the like comprising a electrically erasable and writable nonvolatile memory device 305 for storing a firmware code with a boot system image (a first program) and an application ware image (a second program), a volatile memory device 310 for loading an application ware, and a controller for executing the firmware code to control a content access operation of the optical disk drive, an interface circuit device 315 for I/O interface. One of the examples of the electrically erasable and writable nonvolatile memory device 305 may be a Flash memory. A Flash memory is a type of nonvolatile memory device where erasing can only be done in memory blocks or the entire chip. Thus, upgrading a Flash memory may be done faster than upgrading regular EEPROM. The nonvolatile memory device 305 stores a boot system image in a first portion 306 and an application ware image in a second portion 307. Further, the boot system ware and the application ware may be compressed separately and stored in the first portion 306 and the second portion 307 of the nonvolatile memory device respectively when a manufacturer wants to utilize the nonvolatile memory space.

Figure 4:
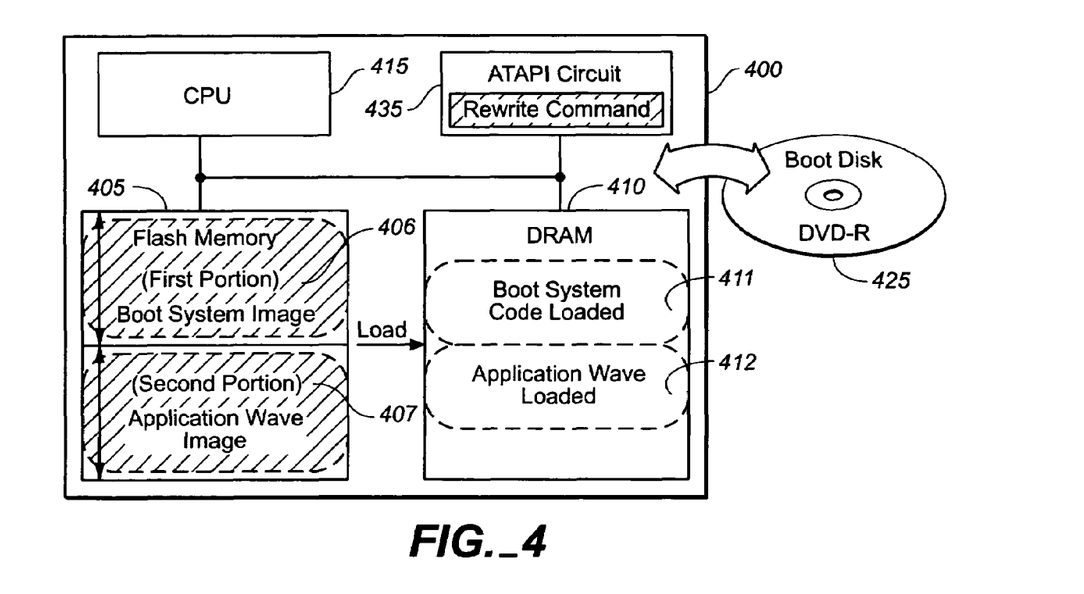
FIG. 4 is a schematic block diagram illustrating an exemplary DVD product in accordance with the present invention, wherein the DVD product starts performing an upgrading process.
Figure 5:
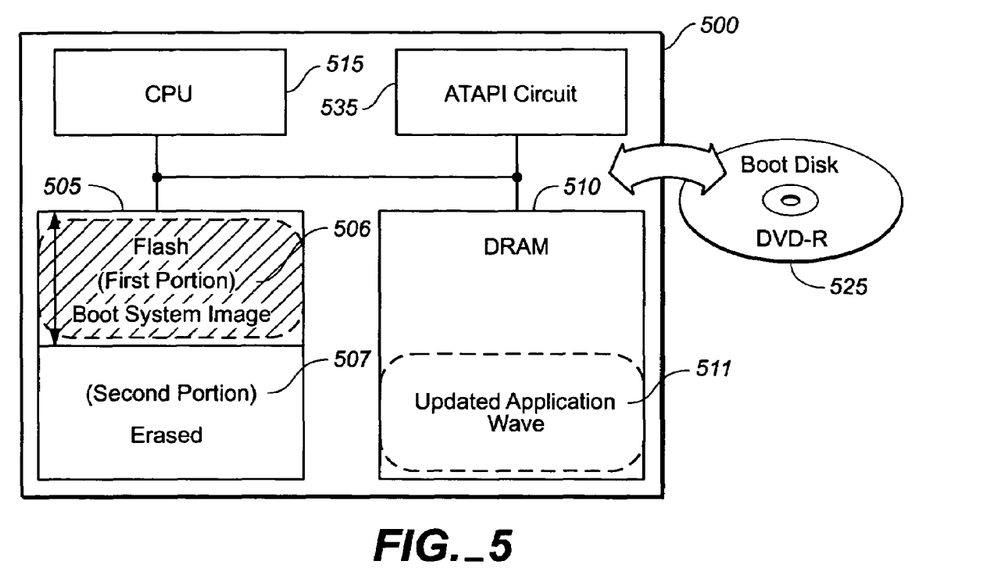
FIG. 5 is a schematic block diagram illustrating an exemplary DVD product subsequently to the schematic block diagram shown in FIG. 4, wherein the DVD product performs an erasing operation.
Figure 6:
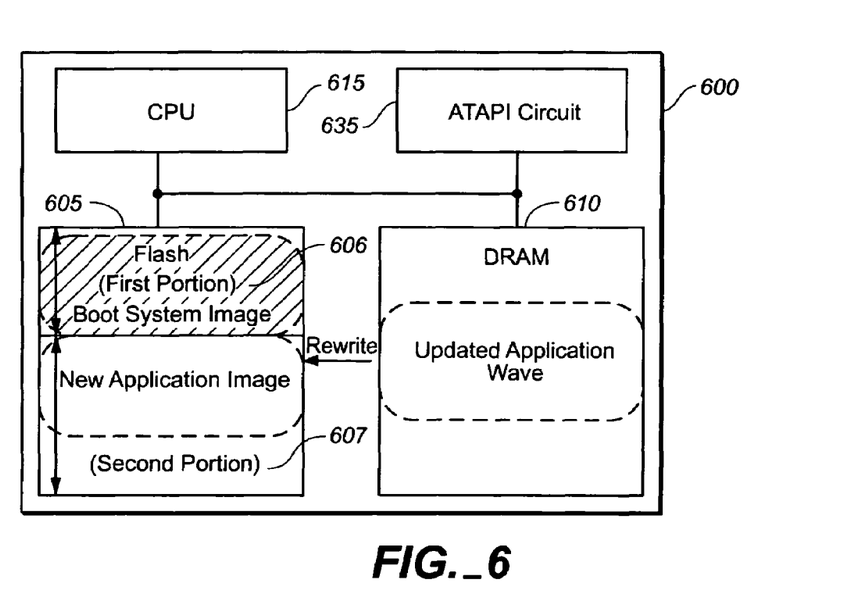
FIG. 6 is a schematic block diagram illustrating an exemplary DVD product subsequently to the schematic block diagram shown in FIG. 5, wherein the DVD product performs a writing operation.

FIGS. 4 to 6 sequentially show the operation of rewriting the application program according to an embodiment of the present invention wherein a DVD product is employed as an example of a particular embodiment of the present invention.

As shown in FIG. 4, A DVD product 400 may comprise a Flash memory device 405 for storing a firmware code with a first portion (storing a first program) 406 and a second portion (storing a second program) 407, Dynamic Random Access Memory (DRAM) 410 a control process unit (CPU) 415, and an ATAPI circuit device 435 for I/O interface. Initially the Flash memory device 405 may store the firmware code of the DVD product 400 and the firmware code may be loaded (copied and decompressed) to DRAM 410 to allow the CPU 415 to operate the DVD product 400. A rewriting command for the firmware code may be supplied to an ATAPI circuit 435 from an optical disk. An example of the optical disk may be a DVD-R 425. An end user may insert an upgrading DVD-R 425 into the DVD product 400 to activate the rewriting command. The DVD-R 425 which stores an upgraded application program along with a rewriting command for the DVD product 400 may be provided by a manufacturer of the DVD product 400. The ATAPI circuit 435 may recognize the rewriting command, and supply the rewriting command to the controller 415.

Subsequently, as shown in FIG. 5, the updated application program via the ATAPI circuit 535 may be loaded to DRAM 510. The CPU 515 may execute the input control program which is a part of the application program. Thus, the CPU 515 may load the upgraded application program 511 supplied to the ATAPI circuit 535 from DVD-R 525, into the DRAM 510. The CPU 515 may erase the second portion 507 of the Flash memory 505 after loading the upgraded application ware to DRAM 510. Then, as shown in FIG. 6, the controller 615 may rewrite the Flash memory 605 with the upgraded application program. After successful upgrading operation, the first portion 605 of the Flash memory 605 may store the unchanged boot system ware image, and the second portion 607 of the Flash memory 605 may store the new upgraded application ware.

Figure 7:
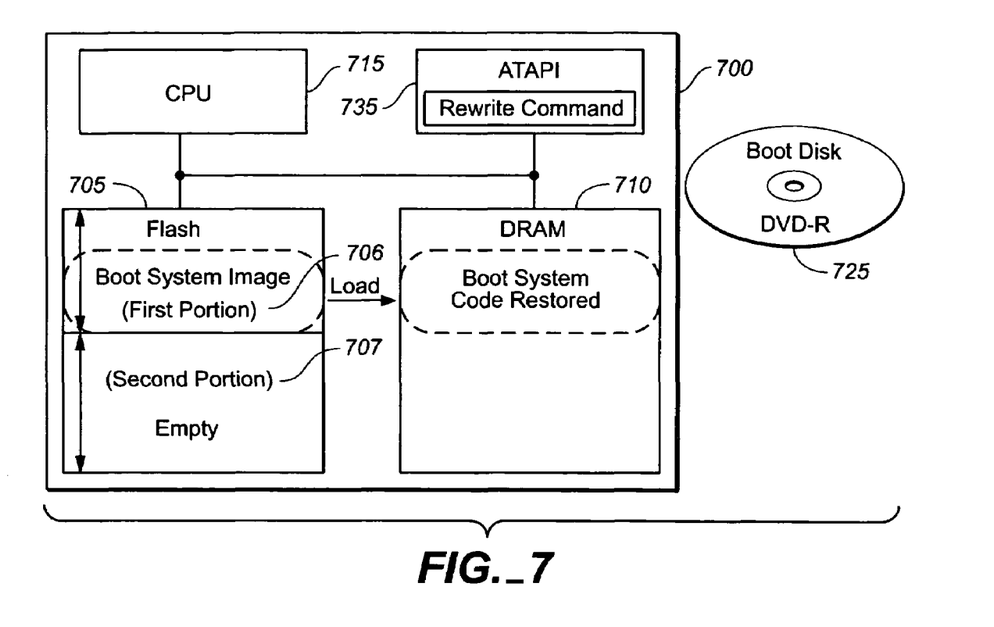
FIG. 7 is a schematic block diagram illustrating an exemplary DVD product subsequently to the schematic block diagram shown in FIG. 5 wherein the DVD product performs a restoring operation.
Figure 8:
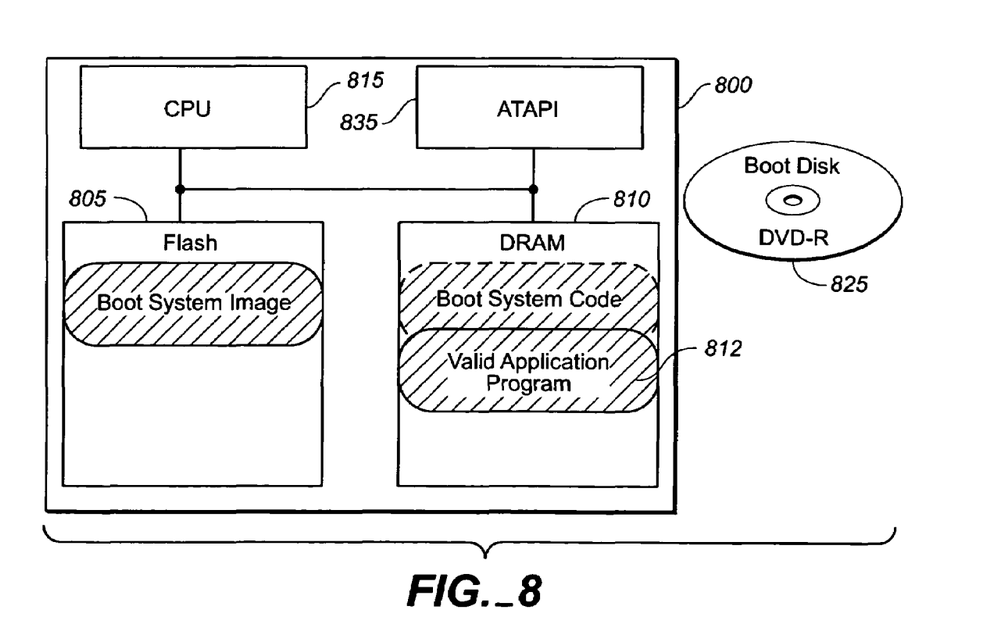
FIG. 8 is a schematic block diagram illustrating the state of an exemplary DVD product subsequently to the schematic block diagram the shown in FIG. 7.

FIGS. 7 to 8 sequentially show the operation of restoring an embodiment of the present invention wherein a DVD product is employed as an example of a particular embodiment of the present invention.

FIG. 7 illustrates a block diagram of a DVD product upon reception of a restoring command when an unexpected event may terminate the rewriting operation. An example of activating a restoring command may be a key press by an end user. In the event of casualty during upgrading process, a user may press the open/close tray key on the front panel of a DVD product 700 as directed by the manufacturer who may provide a boot disk 725 that stores an upgraded application program and a valid application program ware. The CPU 715 may load the boot system code 711 to DRAM 710 upon reception of a restoring command. Referring back to FIG. 5, only the second portion 507 of the Flash memory 505 may be erased during upgrading process and the first portion 506 of the Flash memory 505 may be unchanged.

Accordingly, the boot system ware image may be remained in the first portion 506 of Flash memory 505 even if an abnormality may have happened. The CPU 715 may initialize the ATAPI circuit 735 by executing the boot system code in the DRAM 710. Thus, the link between the ATAPI circuit 735 and the DRAM 710 may be restored. The CPU 715 may also execute a DVD file system program that is a part of the boot system code in the DRAM 710. Subsequently, the ATAPI circuit 735 may be able to fetch data from DVD-R. Referring now to FIG. 8, the CPU 815 may load a valid application program 812 to DRAM 810 though ATAPI 835 circuit from DVD-R (boot disk) 825. For example, the DVD-R 825 may store the valid application program and the upgraded application program if the manufacturer prefers to do. With the valid application program loaded to the DRAM 810, the DVD product 800 may be restored and ready to be upgraded.

Although the invention has been described with a certain degree of particularity, it should be recognized that elements thereof may be altered by persons skilled in the art without departing from the spirit and scope of the invention. It is believed that the method for the present invention and many of its attendant advantages will be understood by the foregoing description, and it will be apparent that various changes may be made in the form, construction, and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for upgrading code of an appliance comprising:
    storing a boot system program in a first portion of a nonvolatile memory device;
    storing an application program in a second portion of said nonvolatile memory device, said boot system program being operable when executed to restore said appliance and said application program being operable when executed to operate said appliance;
    receiving signals from an interface circuit;
    performing input/output decoding on said signals received by said interface circuit;
    loading an upgraded application program from a source external of said appliance to a volatile memory device upon a reception of a rewriting command; and
    writing the contents of said upgraded application program to said second portion of said nonvolatile memory device in accordance with said upgraded application program.

2. The method for upgrading code of an appliance of claim 1, further comprising, determining said signals received by said interface circuit whether said rewriting command has been received.

3. The method for upgrading code of an appliance of claim 1 wherein said appliance is a DVD product.

4. The method for upgrading code of an appliance of claim 1, wherein said interface circuit is an ATAPI interface circuit.

5. A method for upgrading code of an appliance comprising:
    storing a first program in a first portion of a nonvolatile memory device;
    storing a second program in a second portion of said nonvolatile memory device, said first program being operable when executed to restore said appliance and said second program being operable when executed to operate said appliance;
    receiving signals from an interface circuit;
    performing input/output decoding on said signals received by said interface circuit;
    loading said first program stored in said first portion of said nonvolatile memory device to a volatile memory device upon reception of a restoring command;
    executing said first program loaded in said volatile memory device; and
    loading a valid second program into said volatile memory device;
    wherein said valid second program is provided from a source external of said appliance.

6. The method for upgrading code of an appliance of claim 5, further comprising, determining said signals received by said interface circuit whether said restoring command has been received.

7. The method for upgrading code of an appliance of claim 6, wherein said first program comprises an interface circuit driver and a file system code.

8. The method for upgrading code of an appliance of claim 7, further comprising,
    initializing said interface circuit by executing said interface circuit driver; and
    executing said file system code.

9. The method for upgrading code of an appliance of claim 8, further comprising,
    loading an upgraded second program from a source external of said appliance to said volatile memory device upon reception of rewriting command;
    erasing said second program stored in said second portion of said nonvolatile memory device;
    writing the contents of said upgraded second program to said second portion of said nonvolatile memory device in accordance with said upgraded second program after erasing said second program stored in said second portion.

10. The method for upgrading code of an appliance of claim 5, wherein said appliance is a DVD product.

11. The method for upgrading code of an appliance of claim 5, wherein said interface circuit is an ATAPI interface circuit.

12. A method for upgrading code of an appliance comprising,
    storing a first program in a first portion of a nonvolatile memory device;
    storing a second program in a second portion of said nonvolatile memory device, said first program being operable when executed to restore the appliance and said second program being operable when executed to operate the appliance;
    receiving signals from a ATAPI circuit;
    performing input/output decoding on said signals received by said ATAPI circuit to determine whether a rewriting command has been received or a restoring command has been received;
    in the event of reception of said rewriting command, loading an upgraded second program to a volatile memory device, erasing said second program stored in said second portion of said nonvolatile memory device and writing the contents of said upgraded second program to said second portion of said nonvolatile memory device in accordance with said upgraded second program; and in the event of reception of said restoring command, loading said first program stored in said first portion of said nonvolatile memory device to a volatile memory device upon a restoring application operation received, initializing interface circuit, executing file system, reading a valid second program through said ATAPI circuit, loading said valid second program into said volatile memory device;

wherein said valid second program is provided from an optical disk.

13. The method for upgrading code of an appliance of claim 12, further comprising, checking a validity of said second program provided from said source external of said appliance; and when an invalid second program is provided, waiting for said valid second program.

14. The method for upgrading code of an appliance of claim 12, wherein said nonvolatile memory device is a Flash memory device.

\* \* \* \* \*